June 25, 1935. V. B. BUCK 2,006,127
NAVIGATION INSTRUMENT
Filed Jan. 16, 1935 2 Sheets-Sheet 2

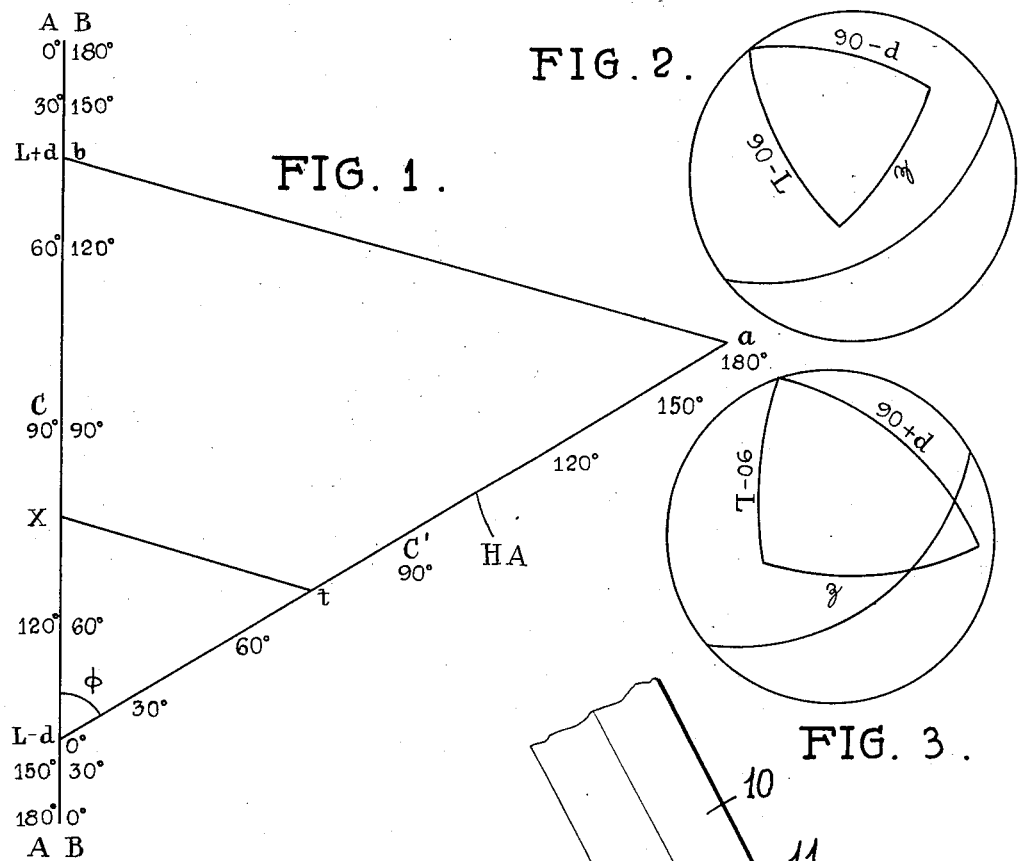
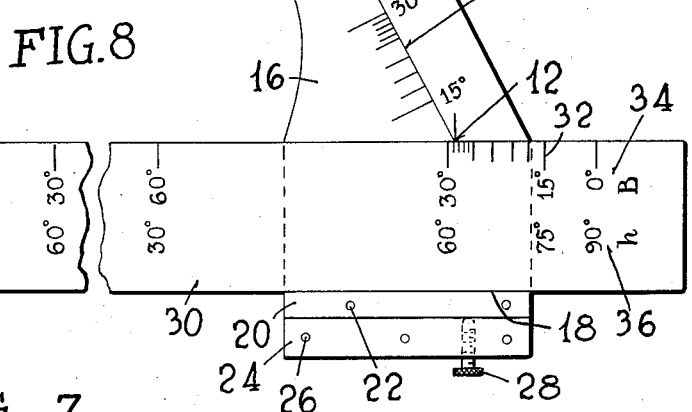
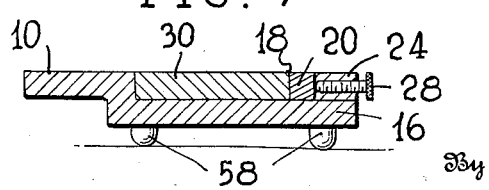

Inventor
Victor B. Buck,

By Bailey Parson
Attorneys

Patented June 25, 1935

2,006,127

UNITED STATES PATENT OFFICE 2,006,127

NAVIGATION INSTRUMENT

Victor B. Buck, New York, N. Y.

Application January 16, 1935, Serial No. 2,103

10 Claims. (Cl. 33—75)

My invention relates to an apparatus for solving graphically navigation problems without the use of tables, and more particularly to an arrangement for solving the general formula for spherical triangles known as the law of cosines.

The general formulæ used in navigation and in other problems of spherical trigonometry is as follows:

$$\cos a = \cos b \cos c + \sin b \sin c \cos A \quad (a)$$

In navigation problems, the conventional nomenclature instituted by Bowditch makes this formula read as follows:

$$\sin h \text{ (or } \cos z\text{)} = \sin L \sin d + \cos L \cos d \cos t \quad (b)$$

In this formula (b), L represents the latitude, $h$ the altitude, $d$ the declination, and $t$ the hour angle.

In order to explain the theory of the present device, reference is made to Fig. 1 of the drawings. The vertical line AB shown in the drawings is made equal in length to the diameter, or to two radii, of a circle of unit radius. This line is divided as a cosine scale, and is marked on opposite sides with the corresponding angles. The scale AA on the left of the line, or the A scale, is taken as positive upward from the center $c$ of the theoretical circle and scale BB on the right, or the B scale, is positive downward from $c$. In other words, the angle markings on the A scale are read from 0° to 180° downward.

In the manner known to navigators, a value of L is assumed and the value of $d$ is derived from the nautical almanac. For the present explanation, it will be assumed that both L and $d$ are positive in sign, or of the same name. For any particular problem, the value of $L-d$ is set off on the B scale. From the point $L-d$ a line is drawn of a length likewise equal to two radii of the unit circle making any angle $\phi$ with the AB scale. For convenience, and because the most accurate results can be obtained in this manner, the angle $\theta$ is made equal to 60°, but the particular angle used in no way affects the calculations.

This second line, which is marked HA and will be called the HA or hour angle scale, is now divided as a cosine scale in such a manner that it is positive to the left of its center $c'$, so that cosine 0°=+1 lies on the AB scale and cos 180°=−1 is at the opposite or right hand end of the HA scale.

Now supposing a line is drawn from the right hand end of the HA scale to meet the scale A at $b$ at a value equal to $L+d$. From a point having the value $t$ on the hour angle scale, (taken as positive, that is, between 0° and 90°) draw another line parallel to $ab$ intersecting the vertical scale at some distance $x$ downward from the center $c$. This produces similar triangles $a$, $b$, $L-d$, and $t$, $x$, $L-d$. From the law of similar triangles, we may then write the ratio:

$$\frac{\cos(L+d)+\cos(L-d)}{2} = \frac{\cos(L-d)-x}{1-\cos t} \quad (I)$$

Solving this equation for $x$ we obtain the equation:

$$x = \sin L \sin d + \cos L \cos d \cos t \quad (c)$$

The second member of this Equation (c) is identical with the second member of Equation (b) above and we find that if $x$ is read on the B scale (a cosine scale) as cos $z$ and positive the conditions of Formula (b) will be fulfilled and the equation accurately solved as to signs and functions.

Now it is immaterial whether we write $-(+x)$ or $+(-x)$; and $-\cos t$ (positive) or $+\cos t$ (negative). For this reason the above chart is applicable to all cases where L and $d$ have the same sign.

If L and $d$ have opposite signs, Equation I becomes:

$$\frac{\cos(L+d)+\cos(L-d)}{2} = \frac{\cos(L+d)-x}{1-\cos t} \quad (II)$$

In obtaining this equation, $L+d$ must be laid off on the B scale and $L-d$ on the A scale. Solving for $x$, we obtain the following formula:

$$x = \cos z = -\sin L \sin d + \cos L \cos d \cos t$$

which is the proper formula for this case. This equation covers every case where L and $d$ have opposite signs.

According to the above equations and formulæ, my device as explained below will solve directly any spherical triangle which can be drawn within a hemisphere where two sides and the included angle, three sides, two angles and the included side or three angles are given.

Referring now to the apparatus itself for carrying out the above procedure, it is shown in the accompanying drawings in which:

Figs. 1 to 3 are graphs for explaining the mathematical theory upon which my invention is based.

Figure 4:
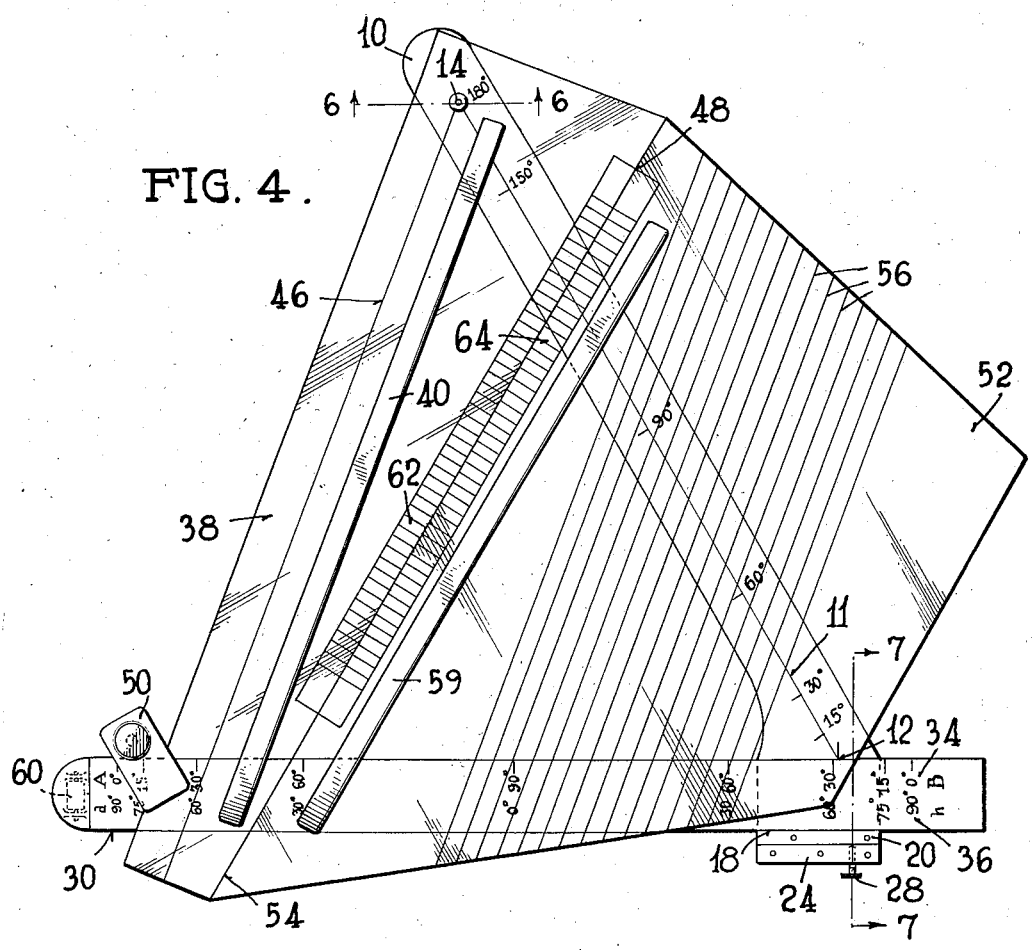
Fig. 4 is a top plan view of my device.
Figure 5:
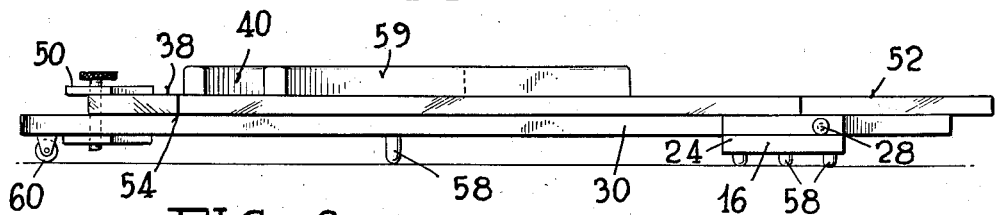
Fig. 5 is a side elevation.
Figure 6:
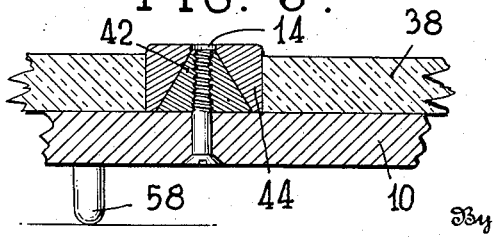

Figs. 6 and 7 are cross sections on the lines 6—6 and 7—7 of Fig. 4.

Fig. 8 is an enlarged plan view of the point of connection between the scales.

According to the invention, the device comprises first a pair of scale members each divided as cosine scales. One of these scale members 10 represents the hour angle or HA scale of Fig. 1 and carries a scale 11 divided as a cosine scale starting with 0° at the point 12 and extending to 180° at the point 14. The 0° end of the scale member 10 is provided with an enlargement 16 having therein a groove 18 running at an angle of approximately 60° to the long axis of the scale member 1. On the side of the groove opposite the scale is arranged a block 20 which is slightly movable on pins 22 and outside of this a block 24 fixed in position on the enlarged portion 16 by pins 26. A set screw 28 is threaded in the block 24 and its end bears against the movable block 20. The block 20 forms one wall of slot 18. This arrangement in effect makes it possible to move one wall of the slot inwardly to clamp therein the other scale member now to be described.

The second scale member 30, hereinafter called the AB scale, corresponds to the vertical or AB scale of Fig. 1. Along its upper edge it carries a series of graduations forming a cosine scale 32, while the body is marked with two sets 34 and 36 of degree markings. These markings run in opposite directions, the marks 34 running from 0° at the right end to 90° in the center and to 0° at the opposite or free end. Markings 36 extend from 0° in the center to 90° at each end. The right hand and the left hand parts of scale 34 thus correspond to the equivalent sections of the B and A scales of Fig. 1. The reason for the remaining scale will be explained below.

The scale 30 slides in the slot 18 and can be adjusted so that any point on it will be opposite the end 12 of the hour angle scale 11. The set screw 28 may then be tightened, and the whole arrangement will represent the two scales shown in Fig. 1.

Suppose now that the right part of scale 34 is set until the point 12 strikes it at a value of $L-d$, where L and d are of the same sign. This corresponds to the setting of the point $L-d$ in Fig. 1.

At the opposite or free end of the HA scale 10, and exactly on the point 14 representing the 180° mark of this scale, is provided a pivot on which turns a transparent member 38 which may be moved by means of a handle 40 around its pivot. The pivot at 14 is preferably a conical one, being in the nature of a conical member 42 upstanding from the scale member 10 and a conical ring 44 fixed in the plate 38. This conical pivot makes it possible for the device to retain its accuracy in spite of any wear, as an accurate centering of the plate 38 on its pivot is requisite to the accuracy of the whole device.

The plate 38 carries a line 46 which extends exactly through the center of the pivot or in other words through the end or 180° point of the HA scale 11. The other end of plate 38 overlies scale member 30 and obviously line 46 may swing along this scale to strike various angle values on the delineations 32. The inner edge, 48, of the member 38 forms an angle with the line 46 for a purpose to be explained below, the member 38 preferably tapering from its pivoted end 14 towards its other end.

If now the plate 38 is moved until the line 46 strikes on the left part of scale 34 (A scale) a value $L+d$, and is held in this position by a suitable clip 50, it will be seen that the line 46 will correspond to the line $a, b$ on Fig. 1.

The final element of my device is a plate 52 of transparent material having an edge 54 adapted to cooperate with edge 48 of plate 38 and having a series of spaced parallel lines 56 forming the same angle with edge 54 as does line 46 with edge 48, so that when edges 48 and 54 are placed together lines 56 will always be parallel to line 46. If now one of the lines 56 is set on the HA scale at a value $t$, being less than 90° and therefore positive, it is evident that the particular line 56 so set on the value $t$ will correspond to the line $tx$ of Fig. 1.

In actual operation, it is only necessary to note which of the lines 56 is nearest the value $t$ in the problem to be solved. By sliding plate 52 in one direction or the other, this line because of the angular edges 48 and 54 will be shifted transversely until it strikes value $t$ on scale 11.

Now from Equation (b) if we set $L-d$ on the B scale 34 opposite the point 12; and set line 46 to a value $L+d$ on the A scale 34 and set member 52 so that one of its lines 56 passes through the value $t$ on scale 10, it is evident that the same line 56 will strike on the B scale 34 the value $x$ or $\cos z$. In this manner, by a proper setting, the value of $z$ can be obtained directly where L, d and $t$ are known.

Where L and d are of opposite sign, it is merely necessary to set the value $L+d$ on the B scale 34 to the point 12 and to set the line 46 at a value $L-d$ on the A scale 34. The line 56 passing through the value $t$ will then give the value of $x$ on the B scale 34.

In order to render the device more satisfactory for use, it is desirable to raise the whole scale slightly off the supporting surface. This may be accomplished for instance by the use of legs 58 at the ends of the HA scale member 10 and, at the outer end of scale 30, a roller 60. This roller is mounted to turn about an axis transverse to the length of the scale and is provided to give easy sliding of the scale in the slot 18 to its desired position of adjustment.

In order to render reading more accurate, I may provide opposed vernier sections 62 and 64 on the edges 48 and 54 respectively, scale 62 for example having 49 spaces equal to 50 spaces on scale 64.

This vernier is used for example by first taking the vernier reading at the particular setting which it is desired to measure and then the readings at the two nearest scale divisions on opposite sides of this point. The vernier readings must then be made progressively greater from the lower scale division through the setting to be read and the higher scale division. In other words, if the readings at the lower and higher scale divisions should be 41 and 34 respectively and in the center at the point to be measured 14, the proportions would then be 41, 14, 34. These are not progressively greater, and in order to make them so 50 must be added to each of the second and third members. The proportions will then be 41, 64, 84. The proportion of the space between the two scale readings of the point to be measured is:

$$\frac{64-41}{84-41}=\frac{23}{43}$$

Assuming that the space between the two scale divisions is 10', the point desired will then be 5.3' beyond the lower scale division. Obviously the vernier reading for the lower scale division is taken first, and the proportionate part of the 10′ interval is then added to the value of the lower marking.

The device may also be used for solving for the azimuth and declination. Referring to Fig. 2, we assume that Z is the azimuth from the elevated pole as indicated. In order to find Z, the triangle should be rotated until Z occupies the position of $t$. The sides of the triangle about Z are then $z$ and $90°-L$. Both of these will be on the same side of the equator since they are both less than 90° for a visible body. By analogy with Equation (I) and referring to the type of chart shown in Fig. 1, we must set $L-h$ on the B scale and $L+h$ on the A scale. The correct azimuth from the elevated pole will then be shown on the HA scale opposite (or, in other words, on a line parallel to the $ab$ line) to $90-d$ on the B scale. In other words, if the line 46 is set to $L+h$ on the A scale 34 and the B scale 34 is set at $L-h$ to the point 12, then one of the parallel lines 56 will be set to $90-d$ on the B scale 34 and this same parallel line will strike the value of Z on the scale 11.

In the case shown in Fig. 3 where L and $d$ are of different sign, the azimuth will be read opposite $90+d$ on the B scale 34. $L-h$ is still set on B and $L+h$ on A.

In order to obtain the azimuth about the depressed pole, it is necessary to solve the co-lunar triangle drawn about $t$. An analysis of the cases which can arise by the rules for co-lunar triangles will show that in such a situation we must reverse the setting $s$ above, setting $L+h$ on B (or setting B scale 34 at $L+h$ on point 12) and $L-h$ on A (or setting line 46 at $L-h$ on A scale 34). The azimuth may then be read on scale 11 opposite $90+d$ on B (or on line 56 set to $90+d$ on B scale 34) if L and $d$ are of the same sign and opposite $90-d$ on B scale 34 if the signs are contrary.

In the problems of navigation, very few questions normally arise of angles greater than 90°, particularly as for as the A and B scales are concerned. For convenience, therefore, these scales are not divided and set off up to 180° in the same manner as in Fig. 1. Instead, scale 34 forms both the A and B scales, each reading from 0° to 90°, the B scale starting with 0° at the right hand end and the A scale with 0° at the left hand end of the scale member 30. For a visible body, the setting on B can never exceed 90°, so that there is no need to extend the scale beyond this point. Alongside the scale B on 34 is a second scale $h$ or 36, the graduations of which are in the opposite direction to those of scale 34. On this scale, the altitudes can be read directly, instead of by subtraction from the zenith distances which are given by scale B.

The value $L+d$ which is read on the A scale may sometimes exceed 90° although such cases are rare. Alongside the A scale therefore I have arranged the other portion of scale 36, as a $d$ scale, the graduations being in the opposite direction from those on A. If it is necessary to read a value of more than 90° on A, 90° may be subtracted from the amount to be read and the difference read on $h$. A value of greater than 90° on B can be likewise read by subtracting 90° and reading on $d$.

According to the invention, it is possible among other problems to find the following values:

1. Altitude or hour angle.
2. Azimuth from either pole.
3. Declination from azimuth, used in star identification.
4. Great circle distances and courses; and the location of intermediate longitudes and latitudes.
5. Hour angle of sunset or sunrise.

The device will not solve directly the original triangles for very large hour angles or azimuths, those greater than 115°, since the various parts of the device cover the graduations for these quantities on the scale 11. However, if the original triangle itself cannot be solved, it is always possible to solve one of the three co-lunar triangles drawn about it by simply reversing the normal settings and using the supplements of the sides and angles.

The current practice with most navigators is to lay off the line of position from an altitude-difference and an azimuth and our newer tables are constructed with this method in view. When the device is available, however, this method is not the simplest one, as it involves a separate solution for azimuth which is unnecessary since an equally correct line of position may be laid off in most cases from a single setting.

In sights near the meridian we may determine two altitude-differences from two assumed longitudes when the line of position is a tangent to the two small circles drawn with these altitude-differences as radii and the assumed positions as centers.

In many sights we may solve once for longitude from the observed altitude (time sight) giving one point on the line of position. We then assume another longitude at the same latitude and get an altitude-difference from that position drawing the line of position from the first point tangent to the small circle with the altitude-difference as radius.

Near the prime vertical neither of the above methods will work; in such a case use the original Sumner method of assuming two latitudes and solving for longitude from each. This involves a change in setting but as the change is slight, it is simpler than making a solution for azimuth.

To plot a circle of position by tabular computation is a laborious process, but if so desired such a circle may be very readily laid out by the device assuming, say, three different latitudes rather far apart and solving for longitude from each, the circle of position so determined being peculiarly satisfactory for high sights where the dead reckoning position was also much in doubt.

In solving for azimuth, it is best to solve the problem from the pole nearest in azimuth as the device will always solve this problem.

Most problems involving the hour angle of the sun may be solved directly, but in the case of a circumpolar star it is sometimes necessary to get the hour angle from the depressed meridian (or $180°-t$). Furthermore, in laying out great circle distances it is sometimes necessary to get the distance from a point vertically opposite the position coming backward along the track.

While I have described herein one embodiment of my invention, I wish it to be understood that I do not intend to be limited by the description except within the scope of the appended claims.

I claim:

1. A device for solving spherical triangles or the like comprising a pair of scales arranged at an angle with one another, at least one of said scales being adjustable longitudinally to vary the point of intersection of the scales, and mechanical means for delineating a line intersecting both of said scales and parallel to a line passing through the end of one of said scales and intersecting the other scale at a variable point.

2. A device for solving spherical triangles and the like comprising a pair of scales intersecting one another, the first of said scales being adjustable longitudinally so as to vary the point of intersection between the scales, a member pivoted at the end of the second scale and intersecting the first scale, whereby said member may indicate a line drawn from the end of the second scale to a variable point on the first scale, and means to delineate a line parallel to said first line and intersecting both said scales, said second line being shiftable along the scales so that a point may be set on one of the scales and a corresponding value read on the other scale.

3. A geometrical instrument for solving spherical triangles and the like comprising a scale, a second scale intersecting said first scale, said first scale being movable longitudinally to vary the point of intersection with the second scale, an element pivoted at the end of the second scale opposite its point of intersection with the first scale and having a line thereon which intersects the first scale, said element having an edge oblique to said line, and a second element having a plurality of parallel lines thereon and having an edge of the same obliquity to its lines, said member being movable across said scales whereby the lines thereon may be shifted but will always be parallel to the line on said first member.

4. A device for solving spherical triangles or the like, comprising a first scale divided as a cosine scale and an hour angle scale divided as a cosine scale from 0° at its inner end to 180° at its free end, said first scale intersecting said second scale at its zero point and movable longitudinally so as to adjust the point of intersection between the scales, a transparent member pivoted at the free end of the second scale and having a line thereon passing through said pivot and intersecting the first scale whereby the point of intersection of the line with the first scale may be varied, said member having its edge toward the point of intersection of the scales oblique to said line, a second member of transparent material having a plurality of parallel lines delineated thereon intersecting both said scales and having an edge of the same obliquity with respect to the lines thereon as the obliquity of the edge of the first member to the line on the first member, whereby said members may be moved to shift the parallel lines on the second member transversely thereto while maintaining said lines always parallel to the line on the first member.

5. In a mathematical instrument, a pair of scales arranged at an angle with one another, means to represent a line passing through the end point of one of said scales and intersecting the other scale, and means to represent a second line parallel to the first line and intersecting both said scales.

6. In a mathematical instrument, a pair of scales arranged at an angle with one another, means to represent a line passing through the end point of one of said scales and intersecting the other scale, and means to represent a second line parallel to the first line and intersecting both said scales, the points of intersection of the first line with the second scale and of the second line with both the scales being variable.

7. In a mathematical instrument, a pair of scales arranged at an angle with one another, means to represent a line passing through the end point of one of said scales and intersecting the other scale, and means to represent a second line parallel to the first line and intersecting both said scales, the points of intersection of the two scales, of the first line with the second scale and of the second line with both the scales being variable.

8. In a mathematical instrument, a pair of scales arranged at an angle with one another, and mechanical devices for representing continuously parallel lines movable towards and from one another, one of which intersects the first of said scales and passes through a fixed point on the second scale and the other of which lines intersects both the scales.

9. In a mathematical instrument, a pair of scales arranged at an angle with one another, one of said scales intersecting the second scale at a fixed point and being movable longitudinally to vary the intersection point on the first scale, and mechanical devices for representing continuously parallel lines movable towards and from one another one of which intersects the first of said scales and passes through a fixed point on the second scale and the other of which lines intersects both the scales.

10. A device for solving spherical triangles and the like comprising a pair of scales intersecting one another, a member pivoted at the end of the second scale and intersecting the first scale, whereby said member may indicate a line drawn from the end of the second scale to a variable point on the first scale, and means to delineate a line parallel to said first line and intersecting both said scales, said second line being shiftable along the scales so that a point may be set on one of the scales and a corresponding value read on the other scale.

V. B. BUCK.